(12) United States Patent
Quigley et al.

(10) Patent No.: US 8,276,563 B2
(45) Date of Patent: Oct. 2, 2012

(54) INTERNAL COMBUSTION ENGINE PISTON

(75) Inventors: David P. Quigley, Columbus, IN (US);
Patrick R. Shea, Columbus, IN (US);
Aaron S. Quinton, Columbus, IN (US);
Dana E. Richardson, Columbus, IN (US); Doug Doup, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 828 days.

(21) Appl. No.: 10/603,528

(22) Filed: Jun. 25, 2003

(65) Prior Publication Data
US 2004/0123832 A1    Jul. 1, 2004

Related U.S. Application Data

(60) Provisional application No. 60/392,412, filed on Jun. 28, 2002.

(51) Int. Cl.
*F02M 1/00*    (2006.01)

(52) U.S. Cl. ...... 123/274; 123/276; 123/279; 123/193.6

(58) Field of Classification Search ............... 123/193.6, 123/274, 275, 276, 279, 294, 299, 300, 661
See application file for complete search history.

(56) References Cited

U.S. PATENT DOCUMENTS

| | | |
|---|---|---|
| 3,056,638 A | 10/1962 | Hovde |
| 3,915,141 A | 10/1975 | Ottl et al. |
| 4,013,057 A | 3/1977 | Guenther |
| 4,137,887 A | 2/1979 | Dunn |
| 4,161,165 A | 7/1979 | Belush et al. |
| 4,164,913 A | 8/1979 | Komiyama et al. |
| 4,180,027 A | 12/1979 | Taylor |
| 4,253,430 A | 3/1981 | Garter et al. |
| 4,270,494 A | 6/1981 | Garter et al. |
| 4,494,501 A | 1/1985 | Ludovico |
| 4,502,422 A | 3/1985 | Brann |
| 4,517,930 A | 5/1985 | Nakano et al. |
| 4,531,269 A | 7/1985 | LaBouff |
| 4,532,686 A | 8/1985 | Berchem |
| 4,577,595 A | 3/1986 | Deutschmann et al. |
| 4,581,983 A | 4/1986 | Moebus |
| 4,617,887 A | 10/1986 | Nagase et al. |
| 4,644,853 A | 2/1987 | Russell et al. |
| 4,651,631 A | 3/1987 | Avezou |
| 4,662,319 A | 5/1987 | Ayoul |
| 4,709,621 A | 12/1987 | Matsui et al. |
| 4,781,159 A | 11/1988 | Elsbett et al. |
| 4,805,518 A | 2/1989 | Heban, Jr. |
| 4,838,149 A | 6/1989 | Donnison et al. |
| 4,867,119 A | 9/1989 | Cooper et al. |
| 4,939,984 A | 7/1990 | Fletcher-Jones |

(Continued)

OTHER PUBLICATIONS

IVECO Cursor, Downsizingkonzepte fur Otto- und Dieselmotoren Haus der Technik e.V./Fachhochschule Munchen Leitung: Prof. Dr.-Ing W. Bauer 26./27. Juni 2000.

*Primary Examiner* — John Kwon
(74) *Attorney, Agent, or Firm* — Krieg DeVault LLP

(57) ABSTRACT

An internal combustion engine piston having a combustion bowl with fuel control structure for redirecting at least a portion of the fuel exiting the combustion bowl. One form of the piston includes a sharp edge disposed at the outer surface of the piston adjacent the entrance to the combustion bowl and a rounded fuel receiving lip located within the combustion bowl.

17 Claims, 4 Drawing Sheets

U.S. PATENT DOCUMENTS

| | | |
|---|---|---|
| 4,986,167 A | 1/1991 | Stratton et al. |
| 4,989,559 A | 2/1991 | Fletcher-Jones |
| 5,065,706 A | 11/1991 | Zvonkovic |
| 5,081,967 A | 1/1992 | Kemnitz et al. |
| 5,081,968 A | 1/1992 | Bruni |
| 5,113,817 A | 5/1992 | Kemnitz et al. |
| 5,115,726 A | 5/1992 | Daxer et al. |
| 5,121,722 A | 6/1992 | Horiuchi |
| 5,136,992 A | 8/1992 | Bregler et al. |
| 5,144,923 A | 9/1992 | Leites et al. |
| 5,146,883 A | 9/1992 | Reipert et al. |
| RE34,139 E | 12/1992 | Cooper et al. |
| 5,230,148 A | 7/1993 | Martins Leites et al. |
| 5,261,363 A | 11/1993 | Kemnitz |
| 5,279,268 A | 1/1994 | Brink et al. |
| 5,307,732 A | 5/1994 | Berlinger |
| 5,352,538 A | 10/1994 | Takeda et al. |
| 5,505,171 A | 4/1996 | Gazzard |
| 5,511,521 A | 4/1996 | Bischofberger et al. |
| 5,605,126 A | 2/1997 | Hofmann et al. |
| 5,653,156 A | 8/1997 | Issler et al. |
| 5,653,204 A | 8/1997 | Shaffer |
| 5,660,156 A | 8/1997 | Whitacre et al. |
| 5,692,430 A | 12/1997 | McLaughlin et al. |
| 5,724,933 A | 3/1998 | Silvonen et al. |
| 5,746,169 A | 5/1998 | Issler et al. |
| 5,778,533 A | 7/1998 | Kemnitz |
| 5,778,846 A | 7/1998 | Mielke |
| 5,809,962 A | 9/1998 | Abbott et al. |
| 5,868,112 A | 2/1999 | Mahakul et al. |
| 5,901,678 A | 5/1999 | Bielaga |
| 5,906,182 A | 5/1999 | Blase et al. |
| 5,913,960 A | 6/1999 | Fletcher-Jones |
| 5,975,040 A | 11/1999 | Silvonen et al. |
| 5,979,298 A | 11/1999 | Whitacre |
| 6,026,777 A | 2/2000 | Kemnitz et al. |
| 6,152,101 A * | 11/2000 | Parsi ............................ 123/276 |
| 6,182,630 B1 | 2/2001 | Zhu et al. |
| 6,202,619 B1 | 3/2001 | Keller et al. |
| 6,223,701 B1 | 5/2001 | Kruse |
| 6,279,455 B1 | 8/2001 | Kruse |
| 6,286,414 B1 | 9/2001 | Kruse |
| 6,314,933 B1 * | 11/2001 | Iijima et al. ................ 123/193.6 |
| 6,327,962 B1 | 12/2001 | Kruse |
| 6,491,013 B1 * | 12/2002 | Gaiser et al. ............... 123/193.6 |
| 6,513,477 B1 * | 2/2003 | Gaiser et al. ............... 123/193.6 |
| 6,536,404 B2 * | 3/2003 | Liu et al. ....................... 123/263 |
| 6,539,910 B1 * | 4/2003 | Gaiser et al. ............... 123/193.6 |
| 6,601,561 B1 * | 8/2003 | Liu et al. ....................... 123/276 |
| 6,637,402 B2 * | 10/2003 | Liu ................................. 123/279 |
| 6,705,273 B1 * | 3/2004 | Liu et al. ....................... 123/263 |
| 2002/0043240 A1 | 4/2002 | Samenfink et al. |

* cited by examiner

INTERNAL COMBUSTION ENGINE PISTON

The present application claims the benefit of United Stated Provisional Patent Application Ser. No. 60/392,412 filed Jun. 28, 2002, and entitled INTERNAL COMBUSTION ENGINE PISTON. The provisional patent application is incorporated herein by reference.

BACKGROUND OF THE INVENTION

The present invention relates generally to internal combustion engine pistons. More particularly, in one embodiment the internal combustion engine piston of the present invention includes a combustion bowl therein with fuel flow control structure for redirecting a portion of the fuel within the combustion chamber.

In view of the increasing environmental and legislative pressures worldwide to improve engine exhaust emission, engine manufacturers are focusing more attention on the development of new engines to achieve substantial reductions in emissions without compromising combustion efficiency or specific fuel consumption. One important requirement for clean combustion in an internal combustion engine is the movement of fuel within the combustion chamber.

Although many of the prior internal combustion engine piston designs are steps in the right direction, there still remains a need for additional improvement to satisfy the environmental and legislative pressures. The present inventions satisfy this and other needs in novel and non-obvious ways.

SUMMARY OF THE INVENTION

In one form of the present application there is contemplated an apparatus comprising a piston having a longitudinal centerline and a first end, the piston having a circumferential sidewall portion and a bottom wall portion defining a combustion bowl within the piston at the first end, the sidewall portion including a sharp edge at the first end of the piston and a substantially rounded lip spaced axially from the sharp edge, the combustion bowl defined at the sharp edge is round and the rounded lip is closer to the centerline than the sharp edge is to the centerline.

In another form of the present application there is contemplated an apparatus comprising a piston body having a longitudinal centerline and a first end surface, the piston body having a combustion bowl defined therein with an entrance adjacent the first end surface, the piston body having a sharp edge portion at the entrance for directing a fuel exiting the combustion bowl away from the first end surface and a rounded portion for receiving a fuel thereon within the combustion bowl, the rounded portion is located closer to the longitudinal centerline than the sharp edge portion is located to the centerline and the entrance is round.

In yet another form of the present invention, there is contemplated an apparatus comprising a piston body having a longitudinal centerline and a first end, the piston body having a circumferential sidewall portion and a bottom wall portion defining a combustion bowl within the piston, the combustion bowl having a substantially round entrance at the first end, the sidewall portion including fuel directing means at the entrance for directing a fuel leaving the combustion bowl away from the first end and fuel receiving means for receiving a fuel within the combustion bowl, the fuel directing means is located a first distance from the centerline and the fuel receiving means is located a second distance from the centerline, and the first distance is greater than the second distance.

One object of the present invention is to provide a unique internal combustion engine piston.

Related objects and advantages of the present invention will be apparent from the following description.

DESCRIPTION OF PREFERRED EMBODIMENTS

Figure 1:
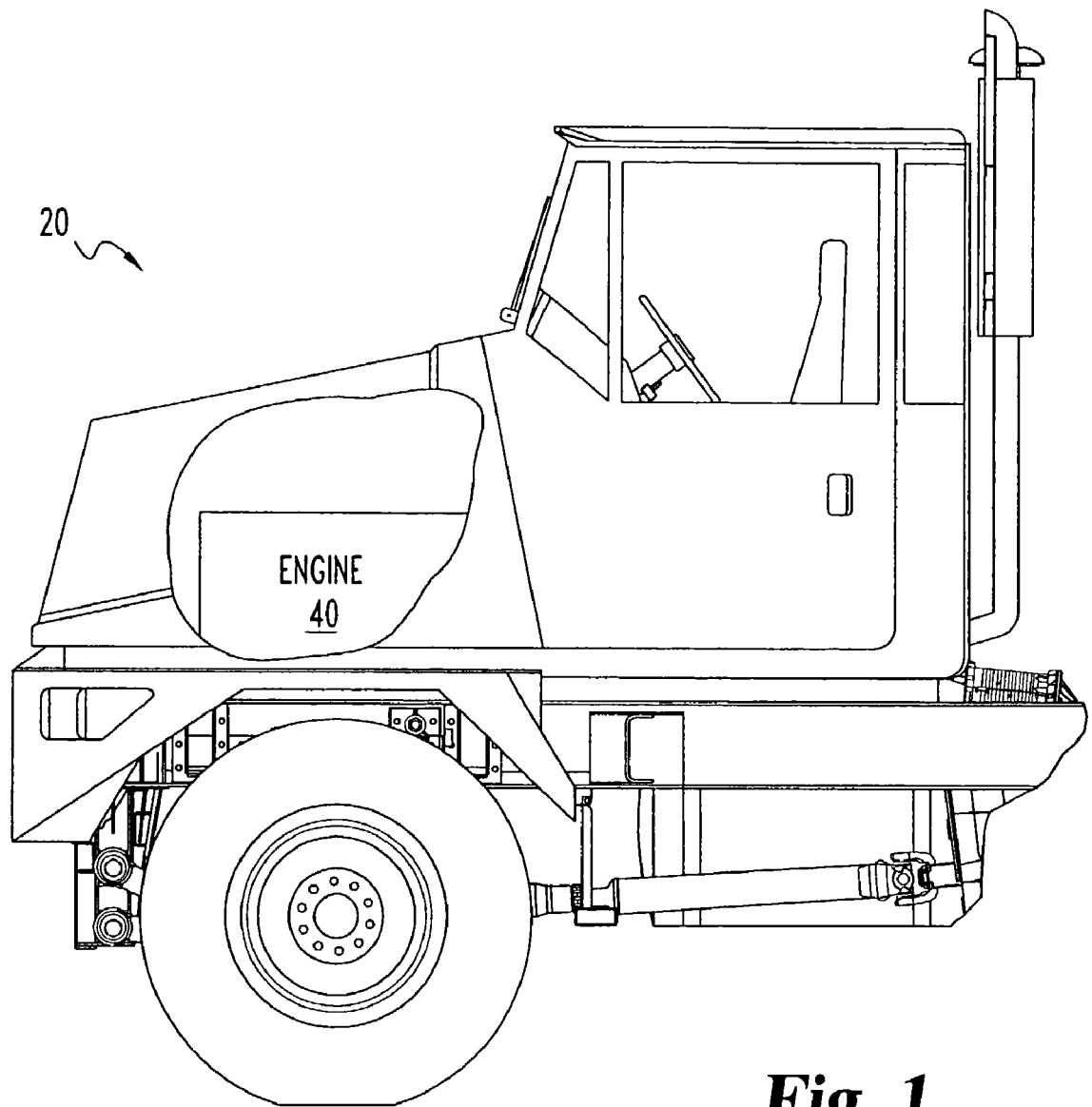
FIG. 1 is an illustrative view of a portion of a vehicle including an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a portion of a vehicle 20 including an internal combustion engine 40. While the internal combustion engine 40 has broad application in vehicles the present invention also contemplates the utilization of the engine 40 in non-vehicular applications such as, but not limited to: stationary power plants, generator sets, auxiliary power systems, industrial stationary equipment, marine propulsion. In a preferred form of the present invention the internal combustion engine 40 is a compression ignition (diesel) internal combustion engine. However, gasoline, spark ignition and other types of internal combustion engines are contemplated herein. The reciprocating piston internal combustion engine 40 includes an engine block and at least one combustion chamber. Of course, the engine may contain a plurality of combustion chambers, typically four to eight, which may be arranged in line or in a "V" configuration. In a preferred form of the present invention the engine contains a plurality of combustion chambers.

Figure 2:
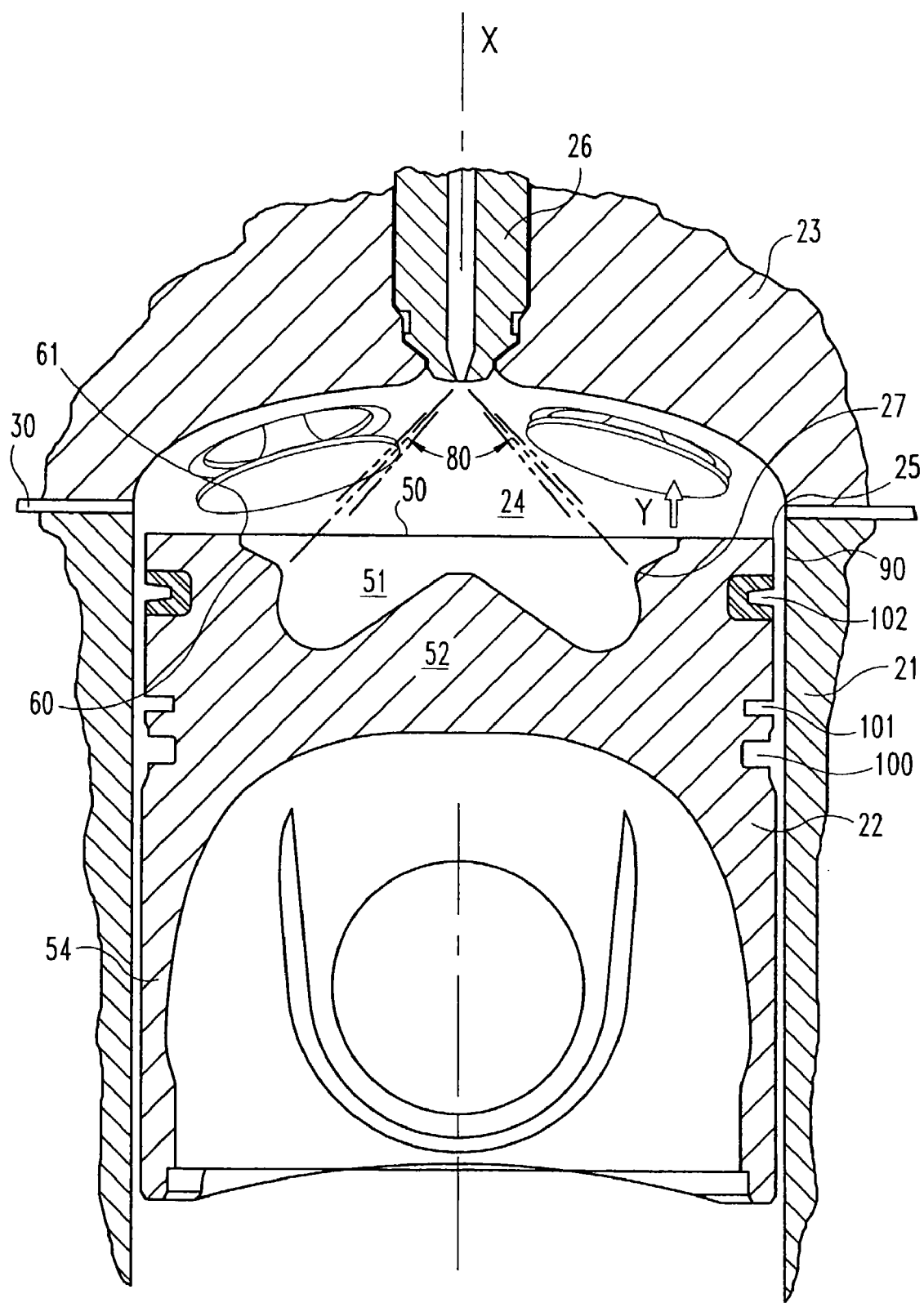
FIG. 2 is an illustrative sectional view of a portion of the engine of FIG. 1 showing a piston comprising one form of the present invention.

With reference to FIG. 2, there is illustrated a portion of engine 40 including the cylinder block 21, piston 22 and cylinder head 23. In a preferred form the cylinder head 23 is removable and a gasket 30 is disposed between the cylinder head 23 and the engine block 21. Further, the piston 22 has been illustrated within the cylinder cavity 25 with the rings removed. Although not specifically illustrated, the piston 22 is connected through a connecting rod to the crankshaft of the internal combustion engine. The internal combustion engine causes the piston 22 to reciprocate along a rectilinear path within the cylinder cavity 25. A combustion chamber 24 is formed at end of the cylinder cavity 25 and is bounded by the cylinder head 23 and the top surface of the piston 22. A fuel injector nozzle 26 injects fuel into the combustion chamber. In a preferred form of the present invention the fuel injector nozzle 26 delivers a plume of fuel to a portion 27 of the piston 22 the discharge of the fuel. The present invention contemplates variations in the engine, including, but not limited to, other fuel injection systems, combustion chamber shapes, number and location of valves, and cylinder cavities having a removable cylinder liner.

Figure 3:
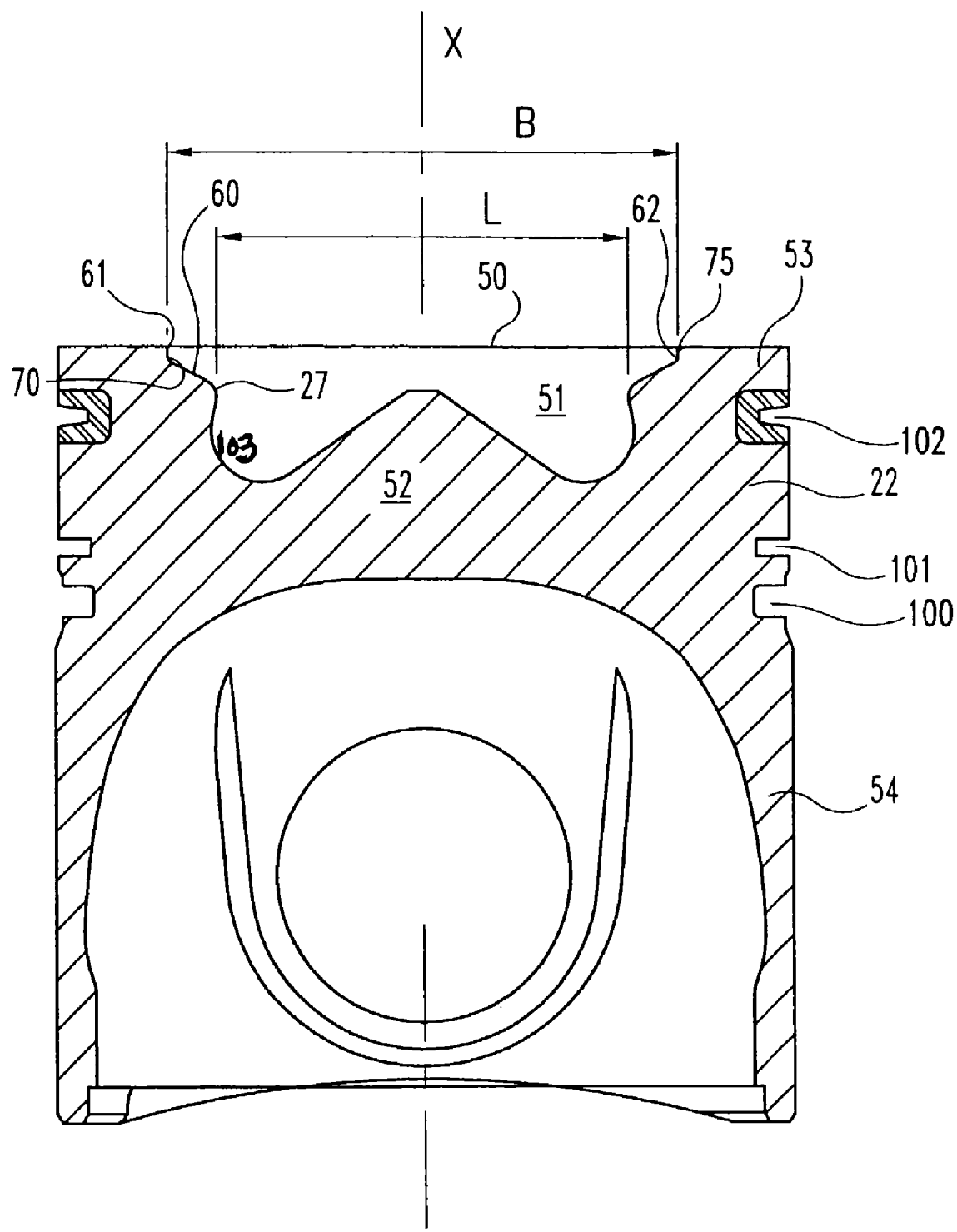
FIG. 3 is a view of the piston of FIG. 2 removed from the engine.

With reference to FIG. 3, there is illustrated the piston 22 removed from the cylinder cavity 25 of the internal combustion engine 40. In one form the piston is an integral metallic structure formed of a heat resistant alloy. However, the present application contemplates that the piston could be of a variety of other styles, including, but not limited to, an articulated piston, monobloc piston, forged piston, multi-piece piston, and other configurations known to those of skill in the art. The piston may be formed of a metallic, intermetallic, ceramic, and/or composite material. The material is preferably selected to withstand the normal temperatures and pressures associated with an internal combustion engine combustion chamber. The illustrated piston 22 includes a head 52 having a crown 53 and a piston skirt 54 extending from the head 52. However, depending on the type of piston configuration, there may be some differences in the basic structure of the piston. The piston further includes a plurality of piston ring grooves 100, 101 and 102 for receiving piston rings therein (not illustrated). The location and number of ring grooves 100, 101 and 102 are not meant to be limiting, and pistons having other numbers and locations of ring grooves are contemplated herein.

The upper surface 50 of piston 22 is provided with a cavity 51, which will generally be referred to as a combustion bowl. More specifically, the combustion bowl 51 is formed in the piston 22 and extends downwardly from the crown 53 to a bottom wall. The bottom wall has been illustrated as having a substantially Mexican-hat shape. However, other geometric shapes are contemplated herein including, but not limited to round, no-apex, or highly reentrable bowls. In a preferred form the combustion bowl 51 is symmetrical about a centerline X and has a substantially circular shape. A portion 27 of the piston defines a rounded lip extending circumferentially along an intermediate location of the combustion bowl 51. In one form of the portion 27 overlays a portion of the region 103 of the bowl 51. An upwardly flared outer bowl section 60 is formed in the piston adjacent to the rounded lip 27 and extends toward the substantially sharp lip portion 61. The sharp lip portion 61 extends along the circumference of the combustion bowl 51 adjacent the top surface 50. In one form the sharp lip portion 61 includes an upstanding wall 62 that extends from the sharp lip portion 61 towards the upwardly flared outer bowl section 60. The sharp lip portion 61 includes a sharp edge 75 defined at the junction between the top surface 50 of the piston and the upstanding wall 62. In one embodiment the upstanding wall 62 extends about 1 millimeter from the top surface 50 of the piston. In a more preferred form of the invention the upstanding wall 62 is substantially parallel to the centerline X. In one embodiment a radius 70 transitions from the upstanding wall 62 to the upwardly flared outer bowl section 60. The diameter of the combustion bowl 51 at the sharp lip portion 61 is represented by arrow 'B' and the diameter of the combustion bowl at the rounded lip portion 27 is represented by arrow 'L'. In one form of the present invention the diameter 'B' is about 70 millimeters and the diameter 'L' is about 56.5 millimeters. In one form the piston 22 has a diameter within the range of about 3 inches to about 6 inches, and more preferably has a diameter of about 4 inches. However, pistons having other sizes are contemplated herein unless specifically provided to the contrary. Further, other lengths and sizes are also contemplated herein.

Figure 4:
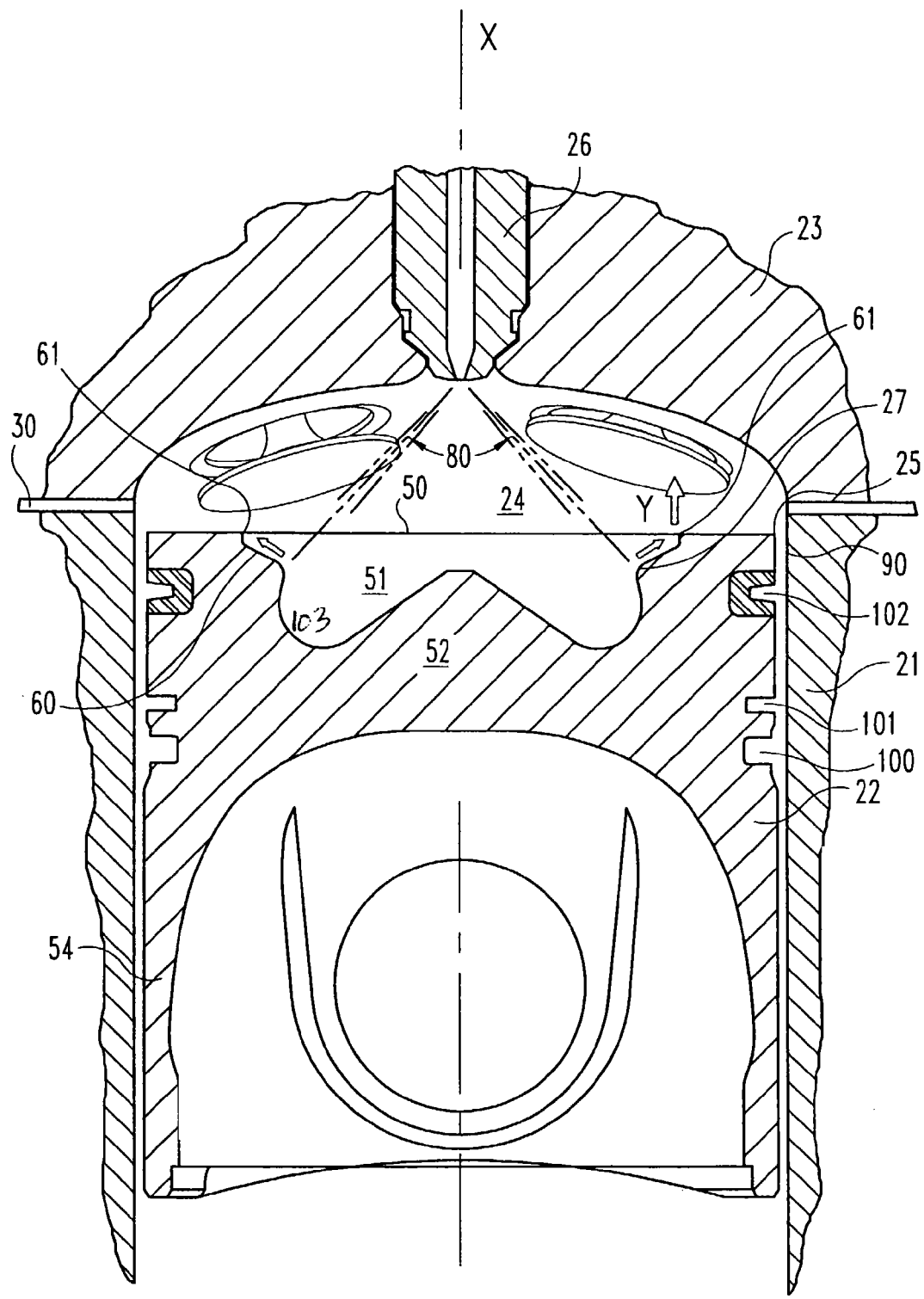
FIG. 4 is a view illustrating the movement of fuel within the bowl comprising a portion of the piston of the present invention.

The structure of the piston 22 has been set forth above with the aid of FIGS. 2 and 3. With reference to FIG. 4, there is illustrated one application wherein the fuel plume 80 from the injector is targeted at the circumferential rounded lip 27 in the combustion bowl 51. A portion of the fuel plume 80 runs up the upwardly flared outer bowl section 60 and hits the sharp lip portion 61 at the top surface 50 of the piston. This configuration directs the portion of the spray plume from the combustion bowl 51 up into the combustion chamber 24 in the general direction of arrow 'Y'. It has been found that the present invention prevents the spray plume from spilling over onto the top surface 50 of the piston and running up against the cylinder cavity wall 90. Thereby reducing the discharge of black smoke and/or particulate emissions and minimizing the passage of fuel and/or soot into the engine oil.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined only by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
a piston having a solid head, a skirt, a longitudinal centerline and a first end including an annular surface, said piston having a circumferential sidewall portion and a bottom wall portion defining a combustion bowl within said solid head at said first end with said annular surface extending thereround, said sidewall portion including a sharp edge at the intersection of said annular surface and a part of said sidewall portion extending substantially parallel to the centerline and a substantially rounded lip overhanging a portion of said combustion bowl and spaced axially from said sharp edge and an upwardly flared portion located between said sharp edge and said substantially rounded lip, said combustion bowl defined at said sharp edge is round and said rounded lip is closer to said centerline than said sharp edge is to said centerline, and wherein said sharp edge directs a fuel passing out of said combustion bowl away from said annular surface.

2. The apparatus of claim 1, wherein said sharp edge limits the fuel from passing out of said combustion bowl and onto said annular surface.

3. The apparatus of claim 1, wherein said sharp edge limits a fuel from passing out of said combustion bowl and across said annular surface.

4. The apparatus of claim 1, wherein said substantially rounded lip is located between said bottom wall portion and said sharp edge.

5. The apparatus of claim 1, wherein said part of said sidewall portion is located between said sharp edge and said upwardly flared portion.

6. The apparatus of claim 1 wherein said combustion bowl is substantially symmetrical about said longitudinal centerline;

wherein said substantially rounded lip is located between said bottom wall portion and said sharp edge, and wherein said substantially rounded lip overhanging a portion of said combustion bowl.

7. The apparatus of claim 1, wherein said piston is formed of one of a metallic, intermetallic, ceramic and composite material.

8. An apparatus, comprising:
a piston body having a longitudinal centerline and a first end surface, said piston body having a combustion bowl defined therein with an entrance adjacent said first end surface, said piston body having a sharp edge portion extending around said entrance for directing a fuel exiting said combustion bowl away from said first end surface and a rounded portion for receiving a fuel thereon within said combustion bowl, said rounded portion overhangs a portion of said combustion bowl and is located closer to said longitudinal centerline than said sharp edge portion is located to said centerline, and wherein said sharp edge portion is defined on a part of a wall of the combustion bowl extending in a direction parallel with said centerline.

9. The apparatus of claim 8, wherein said piston body has an outer circumferential surface, and wherein said sharp edge portion is located radially inward of said outer circumferential surface; and wherein said combustion bowl is symmetrical about said longitudinal centerline.

10. The apparatus of claim 8, wherein said rounded portion extending circumferentially around said combustion bowl.

11. The apparatus of claim 10, wherein said piston body having a bottom surface defining a portion of said combustion bowl, and wherein said rounded portion is located between said bottom surface and said sharp edge portion.

12. The apparatus of claim 11, wherein said piston body having an upwardly flared portion defining a portion of said combustion bowl, and wherein said upwardly flared portion is located between said rounded portion and said sharp edge portion.

13. The apparatus of claim 8, wherein said piston body has an outer circumferential surface; wherein said sharp edge portion is located radially inward to said outer circumferential surface; wherein said combustion bowl is symmetrical about said longitudinal centerline, wherein said piston body having a bottom surface defining a portion of said combustion bowl, and wherein said rounded portion is located between said bottom surface and said sharp edge portion; wherein said piston body having an upwardly flared portion defining a portion of said combustion bowl, and wherein said upwardly flared portion is located between said rounded portion and said sharp edge portion; and wherein said rounded portion, said upwardly flared portion extend circumferentially around said bowl.

14. The apparatus of claim 8, wherein said piston body is free of internal cavities located between said combustion bowl and the outer surface of the piston body.

15. A piston, comprising:
a piston body having a head portion and a skirt portion, said head portion being free of internal cooling passages and having a longitudinal centerline and a first end surface with a combustion bowl defined therein with an entrance adjacent said first end surface, said head having a sharp edge portion extending around said entrance for directing a fuel exiting said combustion bowl away from said first end surface and a rounded portion for receiving a fuel thereon within said combustion bowl, said rounded portion overhangs a portion of said combustion bowl and is located closer to said longitudinal centerline than said sharp edge portion is located to said centerline.

16. The apparatus of claim 15, wherein said sharp edge portion limits the fuel from passing out of said combustion bowl and onto said first end surface.

17. The apparatus of claim 15, wherein said sharp edge portion limits a fuel from passing out of said combustion bowl and across said first end surface.

\* \* \* \* \*